United States Patent
Wood et al.

(10) Patent No.: US 6,490,696 B1
(45) Date of Patent: Dec. 3, 2002

(54) SYSTEM AND METHOD FOR PRINTER OUTPUT REGRESSION TESTING USING DISPLAY LISTS

(75) Inventors: Patrick H. Wood, Lake Hopatcong, NJ (US); Anthony Iannino, Kinnelon, NJ (US)

(73) Assignee: Electronics for Imaging, Inc., Foster City, CA (US)

(*) Notice: Subject to any disclaimer, the term of this patent is extended or adjusted under 35 U.S.C. 154(b) by 0 days.

(21) Appl. No.: 09/464,226

(22) Filed: Dec. 15, 1999

(51) Int. Cl.[7] ............................................ G06F 11/00
(52) U.S. Cl. ..................................... 714/38; 717/124
(58) Field of Search ............................ 714/38; 717/124

(56) References Cited

U.S. PATENT DOCUMENTS

| | | | |
|---|---|---|---|
| 5,022,028 A | 6/1991 | Edmonds et al. ........... 371/25.1 |
| 5,023,811 A | 6/1991 | Donnelly et al. ........... 364/518 |
| 5,299,310 A | 3/1994 | Motoyama .................. 395/165 |
| 5,303,334 A | 4/1994 | Snyder et al. ............... 395/109 |
| 5,313,570 A | 5/1994 | Dermer et al. .............. 395/131 |
| 5,335,342 A | 8/1994 | Pope et al. .................. 395/575 |
| 5,471,563 A | 11/1995 | Dennis et al. ............... 395/114 |
| 5,544,290 A | 8/1996 | Gentile ........................ 395/115 |
| 5,594,840 A | 1/1997 | Sahay et al. ................. 395/113 |
| 5,600,789 A * | 2/1997 | Parker et al. .................. 714/38 |
| 5,613,046 A | 3/1997 | Dermer ........................ 395/109 |
| 5,651,111 A | 7/1997 | McKeeman et al. ... 395/183.14 |
| 5,659,638 A | 8/1997 | Bengtson .................... 382/299 |
| 5,668,931 A | 9/1997 | Dermer ....................... 395/104 |
| 5,673,387 A | 9/1997 | Chen et al. ............ 395/183.14 |
| 5,796,411 A | 8/1998 | Cyman et al. ............... 345/502 |
| 5,815,187 A | 9/1998 | Ross, Jr. ...................... 347/131 |
| 5,828,814 A | 10/1998 | Cyman et al. ............... 395/102 |
| 5,872,902 A | 2/1999 | Kuchkuda et al. .......... 395/130 |
| 5,935,002 A | 8/1999 | Faclciglia ...................... 463/19 |
| 5,974,254 A * | 10/1999 | Hsu ............................... 714/38 |
| 6,046,818 A * | 4/2000 | Benson ........................ 358/1.1 |
| 6,292,270 B1 * | 9/2001 | Schwarz et al. ............ 358/1.13 |
| 6,415,396 B1 * | 7/2002 | Singh et al. ................... 714/38 |

FOREIGN PATENT DOCUMENTS

| | | | |
|---|---|---|---|
| EP | 475601 B1 | 3/1992 | ........... G06T/11/60 |
| EP | 475601 A2 | 3/1992 | ........... G06F/15/72 |
| EP | 578264 A2 | 1/1994 | ........... G06F/11/34 |
| EP | 582490 A2 | 2/1994 | ............. G06K/9/00 |
| EP | 618546 B1 | 10/1994 | .......... G06K/15/00 |
| EP | 618546 A1 | 10/1994 | .......... G06K/15/00 |
| EP | 618564 A1 | 10/1994 | ........... G10K/11/16 |
| EP | 618718 B1 | 10/1994 | ............. H04N/1/46 |
| EP | 618718 A1 | 10/1994 | ............. H04N/1/46 |
| EP | 620534 B1 | 10/1994 | .......... G06K/15/00 |
| EP | 620534 A1 | 10/1994 | .......... G06K/15/00 |
| EP | 782097 A2 | 7/1997 | .......... G06K/15/10 |
| EP | 782098 A2 | 7/1997 | .......... G06K/15/10 |

\* cited by examiner

*Primary Examiner*—Robert Beausoleil
*Assistant Examiner*—Michael Maskulinski

(57) ABSTRACT

A system and method for performing regression testing on software programs that produce printed output. An original version of a software program resident on a computer is issued known commands to generate a reference display list known to produce a known correct or reference printed page. A bitmap of the reference page is not generated. The reference display list includes image, graphic and text objects described by various attributes. A second modified version of the software program is loaded on the computer and issued the same set of known commands. The second software program generates a second is display list. A display list regression testing software module compares the second display list to the reference display list and identifies any differences by object type and attribute. Hence, incorrect results may be isolated to specific objects and more easily debugged in the source code of the software program. Visual comparison of actual printed output is substantially reduced.

20 Claims, 4 Drawing Sheets

SYSTEM AND METHOD FOR PRINTER OUTPUT REGRESSION TESTING USING DISPLAY LISTS

BACKGROUND OF THE INVENTION

1. Technical Field

This invention relates to testing printer output. More particularly, the invention relates to testing printer output using regression techniques based on display list comparison.

2. Description of the Prior Art

The computer industry is dynamic and experiencing rapid, continual change. Software and hardware systems continue to improve at an accelerating rate, benefiting synergistically from prior advances in technology. Hence, in light of this technology upheaval, coalescing software and hardware design to produce a desired consistent output remains a formidable challenge.

An iterative diagnostic and quality control method known as regression testing is used to compare outputs from various combinations of hardware and software to determine if a change in one element of the system causes an undesirable change in the output of the system. If a change in the output does occur, the identified error may be used by designers to modify their particular hardware or software to hopefully eliminate the undesirable change in the system output. Unfortunately, identifying the source of the cause of the change in the output can be quite difficult, given the dependencies between the innumerable hardware and software elements of a computer system.

Generally, output from a computer system may include either the results of a calculation, a display on a computer video terminal or tangible printed output from a computer printer. Computer printers must be designed to work appropriately with thousands of different software programs. Software will direct a printer to produce images, graphics and text with differing attributes, such as position, color, shape, size and resolution. Frequently, the computer generates an instruction set to send to the printer based upon a pre-defined printer definition language (PDL), such as ADOBE'S POSTSCRIPT developed by Adobe Systems, Inc. of Mountainview, Calif. The printer interprets the PDL commands to generate the desired printed page.

Printer manufacturers continually strive to upgrade their printer systems to provide higher quality printed output. As print resolution increases and the available spectrum of colors that can be printed expands, substantially more data must be transmitted to the printer to produce the desired output. As a result, previously satisfactory methods for ensuring consistent, quality printer output prove to be inadequate.

For example, checksum comparison is one method used for regression testing of software that produces printed output. For example, when a software program generates and communicates a print command to a printer, the computer will produce a bitmap of the intended page. The checksum for the bitmap is determined by adding the value of the bits or pixels within the bitmap to arrive at a total sum for the bitmap of the particular page. The checksum is a number requiring only a few bytes of storage space. Consequently, a checksum may be generated for a known correct page and stored for later comparison.

If any element of the software is changed, the same original commands may be communicated to the new modified version of the software to generate a new bitmap for the particular page. A new checksum for this new bitmap is then calculated and compared against the original checksum for the known correct page. If the checksum of the original page and the new page are equal, it suggests that the newest version of the software has not affected printer output. However, it does not ensure that the printed output is consistent. For example, an image may appear to be printed correctly, but its position on the page may be different. A checksum comparison test would suggest that the new page has not changed, although in fact, it has. Hence, the checksum regression testing method must be accompanied by manual visual comparison of archived known correct reference pages against new pages to ensure that the software changes have not affected printer output. The need for manual visual comparison causes this approach to be extremely time consuming, unwieldy, and inaccurate. Full regression testing for just one printer description language (PDL) interpreter can comprise upwards of 10,000 pages, for both color and monochrome, and for two or three different resolutions. Hence, an individual, or team of individuals, might be required to visually compare as many as 60,000 pages of output for just one PDL interpreter. Not only is this exceptionally time consuming, but it also tends to introduce a substantial amount of human error in the quality control process due to the tedious nature of the evaluation.

Another common method used to regression test software programs that produce printed output is known as bitmap comparison. In this method, the bitmap for a new page is compared against the bitmap for a known correct page. This approach consumes substantial memory since the known correct reference pages must be stored for all software and hardware configurations being tested. However, the bitmap comparison method does provide more information than the checksum comparison method, since the number and value of different pixels in the bitmap may be counted. Nonetheless, this method still is unable to classify different types of objects in the bitmap to more readily identify the source of a problem. Additionally, the bitmap comparison method is computationally intensive and also requires substantial human interpretation to identify the source of an incorrect output. Hence, as printers become more advanced, the bit map comparison method becomes even more inefficient and introduces substantial human error into the quality control process.

In addition to the basic checksum and bitmap comparison regression testing techniques discussed above, the prior art includes slight variations on these fundamental approaches. For example, Ross, Jr., Method For Improving The Dimensional Accuracy of Laser Printers, U.S. Pat. No. 5,815,187 (Sep. 5, 1998), describes a method for improving the printed output from a laser printer when the moving components of the printer wear with use. Print commands for a known test pattern are sent to the printer. The printed output is then compared to the original known correct test pattern. An adjustment calibration factor is then manually determined and input into the graphics controller to account for the wear in the laser printer. Ross's method is simply a variation of the bitmap comparison method and is limited in use to adjusting horizontal and vertical dimensional inaccuracies in the printed output.

Edmonds et al, Software Verification Apparatus, U.S. Pat. No. 5,022,028 (Jun. 4, 1991) offers only a slight variation on standard regression testing for software programs. A known set of commands used to generate desired output are automatically replicated and input to a newer revised version of a software program. Edmonds does not suggest any more efficient methods for comparing output generated by the software versions and verifying its accuracy.

Bangston, Method And System For Converting Bitmap Data Into Page Definition Language Commands, U.S. Pat. No. 5,659,638 (Aug. 19, 1997) describes a method for iteratively generating page definition language (PDL) commands from bitmaps generated by scanning the pages of a book. The purpose of Bangston's invention is simply to provide a means to more accurately reproduce printed pages, when the original source for the printing is no longer available. Bangston's method is simply a reverse implementation of the standard bitmap comparison approach directed to a very narrow purpose.

McKeeman et al, Method And Apparatus For Producing A Software Test System Using Complementary Code To Resolve External Dependencies, U.S. Pat. No. 5,651,111 (Jul. 2, 1997) describes a software debugging system where separate portions of the computer code are first independently tested and debugged. Then, each code "unit" is incrementally combined and tested in a similar isolated manner. McKeeman's invention is directed to identifying software bugs that result from external dependencies between these software units. The system attempts to identify which lines of code are exercised or branches of code are covered during the testing process. It attempts to minimize regression by dividing the software program into smaller pieces where it is hoped that any problems might be more easily identified, rather than testing the entire software program through a plurality of regressions. Additionally, McKeeman's system is intended to establish a somewhat standardized testing environment to automate some portions of the regression testing process. However, when applied to regression testing for software producing printed output, McKeeman's system is unlikely to prove effective. Printed output generally requires the cooperation and interaction of the majority of the modules of the software program. McKeeman's system does not provide guidance for using complementary code to quickly focus on the proximate cause of errors in printed output.

Chen et al, System And Method For Selecting Test Units To Be Re-run In Software Regression Testing, U.S. Pat. No. 5,673,387 (Sep. 7, 1997) suggests a fairly basic selective approach to regression testing. The essence of Chen's invention is based on the fundamental observation that one need not test portions of a program which have not been changed. Unfortunately, Chen's method presumes that sections of code are able to function independently of other sections of code. Although the number of regressions may be reduced using Chen's method for certain types of software programs, when applied to software used to produce printed output, it would likely fail for similar reasons identified in McKeeman's system above. The generation of output sufficient for identifying print problems usually results from the interaction of entire portions of the software program, rather than independent entities. Although a portion of code may not have been changed, the code portion may be involved in some manner with generation of PDL for production of printed output.

Accordingly, a need exists for a simple system and method for regression testing of software that produces printed output which requires less human intervention and can more efficiently identify the portion of software code that may be the source of any differences between a new page and a known correct page.

SUMMARY OF THE INVENTION

The invention provides a system and method for regression testing of software programs that produce printed output. Display lists, which are created by the software program before rendering graphical objects into bitmap form, are saved by the system and compared to known reference display lists created by an original version of the software program. The display lists include information compartmentalized by object type, including images, graphics or text. Consequently, any differences in the display lists can be readily categorized by object type and attribute, accelerating the process of identifying the source and cause of any difference between a known correct reference page and a new page generated by the revised version of the software program. This regression testing compartmentalization expedites the debugging of the software program.

Display list regression testing has several advantages. It produces greater detail than both the checksum comparison method and the bitmap comparison method.

Additionally, display list regression testing requires less data storage capacity than a bitmap comparison method. Further, display list regression testing allows one to test only those portions of the code whose output is known to be affected by any changes in the software. For example, if a vendor provides a different font, separate comparisons may be performed on the text and non-text parts of the printed page. Consequently, full regression testing of the entire output spectrum is not required, minimizing the time required to debug the software program. Additionally, the need for human visual comparison of output is minimized, thereby reducing the level of human error in the quality control process.

DETAILED DESCRIPTION OF THE INVENTION

Figure 1:
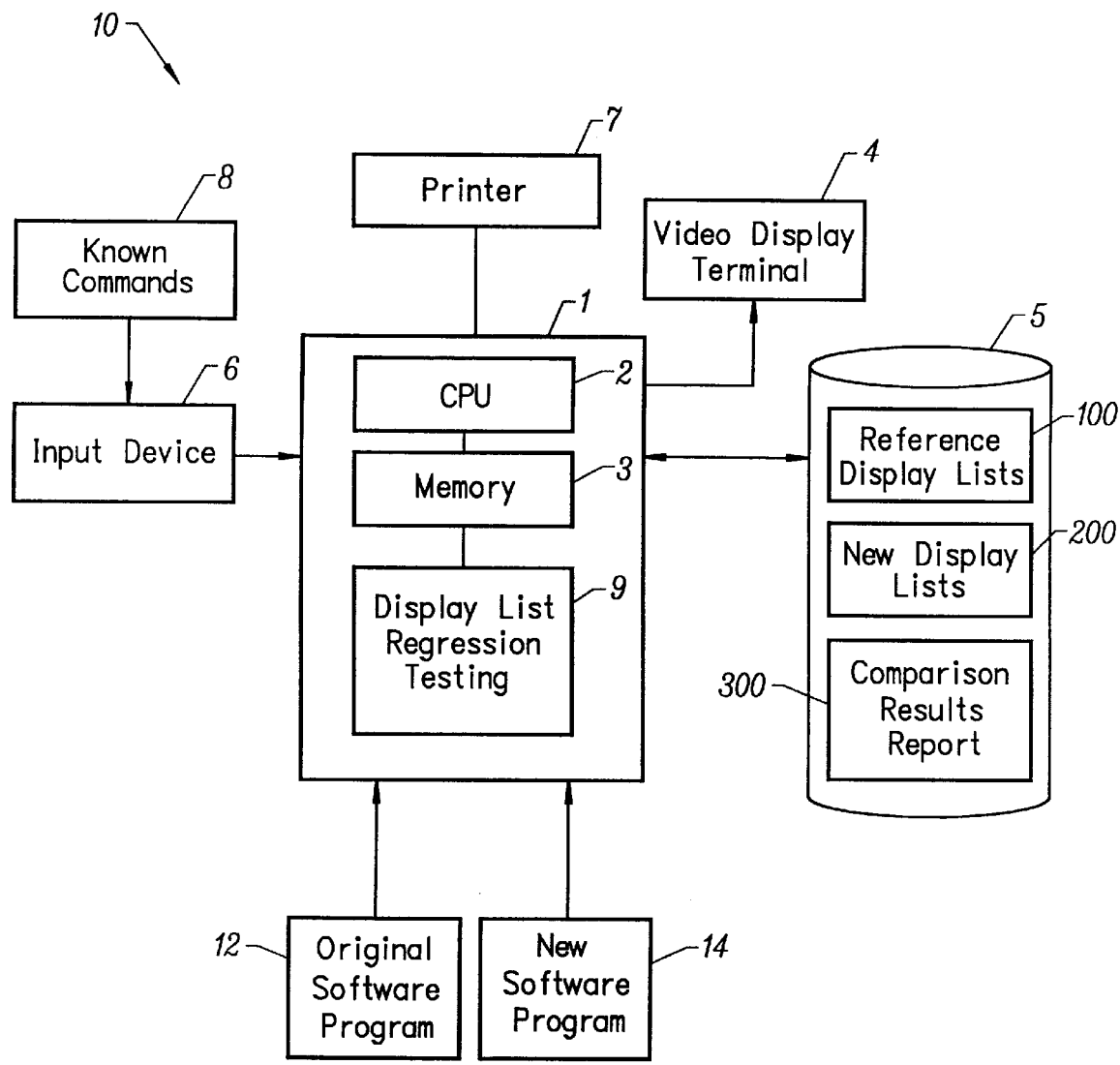
FIG. 1 is a block diagram of the basic components of the display list regression testing system and method, according to the invention.

Referring to the drawings wherein like reference numerals represent like parts throughout the various drawing figures, reference numeral 10 is directed to a system and method for performing regression testing of software programs that produce printed output using display lists. FIG. 1 provides a block diagram of the basic elements of the invention.

In essence, and with initial reference to FIG. 1, the basic elements of the system and method 10 of the invention are described. The system 10 includes a computer 1 having a central processing unit (CPU) 2, memory 3 and an input device 6. The computer 1 is in communication with a video display terminal 4, a data storage device 5, and a printer 7. An original software program 12 and a new modified version 14 of the original software program 12 are loaded on the computer 1. A Display list (DL) regression testing module 9 is resident in the memory 3 of the computer 1 and issues a set of known commands 8 to the original software program 12 to create reference display lists 100. The reference display lists 100 include information compartmentalized by object type, including image objects 150, textual objects 160 and graphic objects 170. The DL regression testing module 9 issues the same set of known commands 8 to the new software program version 14 to create corresponding new display lists 200. The DL regression testing module 9 then compares the new display lists 200 to the reference display lists 100 to verify sameness or identify any differences 101 between the reference display lists 100 and the new display lists 200. The DL regression testing module 9 then causes any identified differences 101 to be listed in a comparison results report 300 and stored in the memory 3 or data storage device 5 of the computer 1. A user may then instruct the system 10 to display the comparison results report 300 via the video display terminal 4 or the printer 7. The user may then analyze the comparison results report 300 to determine what, if any, modifications should be made to the new version of the software program 14 to attempt to produce a subsequent new display list 200 which is substantially equivalent to the reference display list 100. The above system and method 10 is repeated until the differences 101 are deemed to be insignificant, or sufficiently within pre-defined tolerances.

Figure 2:
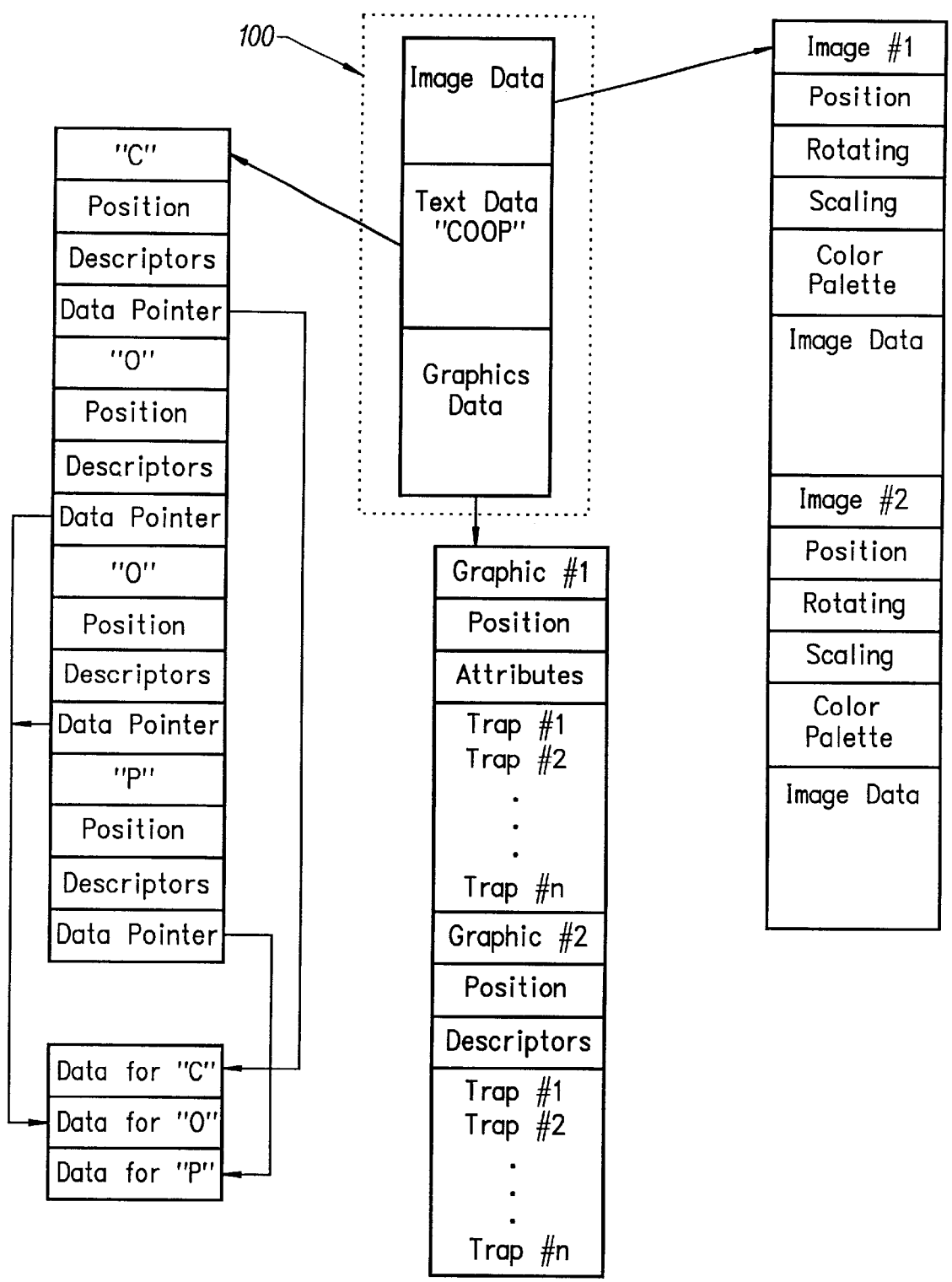
FIG. 2 is a block diagram illustrating various examples of information that might be included in a display list for a particular page, according to the invention.

Referring now to FIG. 2, a block diagram illustrating an example of the type of information that might be included in either a reference display list 100 or new display list 200 is provided. For simplicity, we review an example for only a reference display list 100. Each reference display list 100 may include multiple image objects 150, text objects 160 and graphic objects 170. Image objects 150 have attributes including, but not limited to, position, rotation, scaling, color palette and image data. Further, where additional attributes are developed and included in the reference display list 100 for any objects 150, 160, 170, the system and method 10 of the invention is able to accommodate and compare these new attributes.

Text objects 160 have attributes including, but not limited to, position information, various descriptors, a data pointer and text data. Graphic objects 170 have attributes including, but not limited to, positional information, various descriptors, and additional information for those fundamental objects that may be used to generate the ultimate object. For example "n" number of trapezoids may be used to generate a circle. Hence, the display list may include information describing each trapezoid, including the position of each vertex of the trapezoid.

Figure 3:
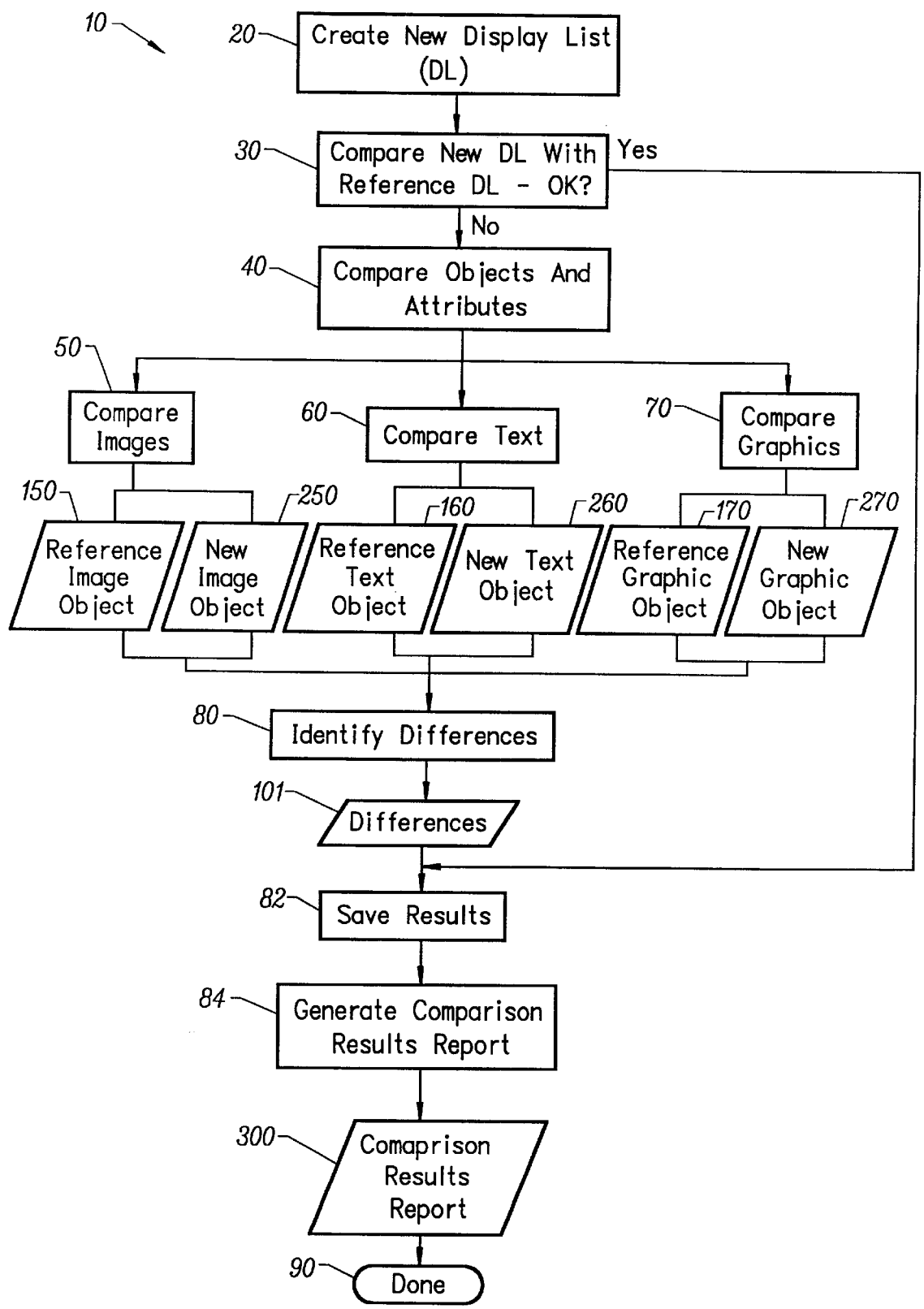
FIG. 3 is a basic flowchart of the operation of the system and method for regression testing using display lists, according to the invention.

More particularly, and with initial reference to the flowchart of FIG. 3, the system and method 10 for performing regression testing of software programs that produce printed output by comparing display lists is described. The flowchart illustrated in FIG. 3 presumes that a user has previously generated the known correct reference display lists 100 for a specific set of known print instructions 8 communicated to the original version of the software program 12 and stored the reference display lists 100 in the data storage device 5 of the computer 1. Additionally, the flowchart of FIG. 3 presumes that the new software program version 14 has been loaded on the computer 1 and the DL regression testing module 9 set of known commands 8 has been issued to the new software program version 14. For clarity, those elements of the flow chart in FIGS. 3 and 4 that represent steps of the method are identified in the text of the document by an underlined numeral.

Once the DL regression testing module 9 causes the set of known commands 8 to be issued to the new software program version 14, the DL regression testing module 9 causes new display lists 200 to be created 20. The DL regression testing module 9 then causes the new display lists 200 to be compared with the reference display lists 100 30. If the new display lists 200 and the reference display lists 100 are equivalent, the DL regression testing module 9 causes the equivalence result to be saved 82 in the comparison results report 300 in the data storage device 5 (FIG. 1).

If the new display lists 200 and the reference display lists 100 are not equivalent, the DL regression testing module 9 then causes the objects 150, 160, 170 and associated attributes of the reference display lists 100 to be compared 40 with the objects 250, 260, 270 and associated attributes of the new display lists 200.

Reference image objects 150 will be compared 50 to new image objects 250. Reference text objects 160 will be compared 60 to new text objects 260. Reference graphics objects 170 will be compared 70 to new graphics objects 270. Any differences 101 will be identified 80, and a comparison results report 300 will be generated 84. The DL regression testing module 9 has then completed its first cycle of comparative testing until the user elects to modify the original new version 14 of the program and once again instructs the DL regression testing module 9 to communicate the set of known commands 8 to the subsequent newer modified version 14 of the original software program 12.

Figure 4:
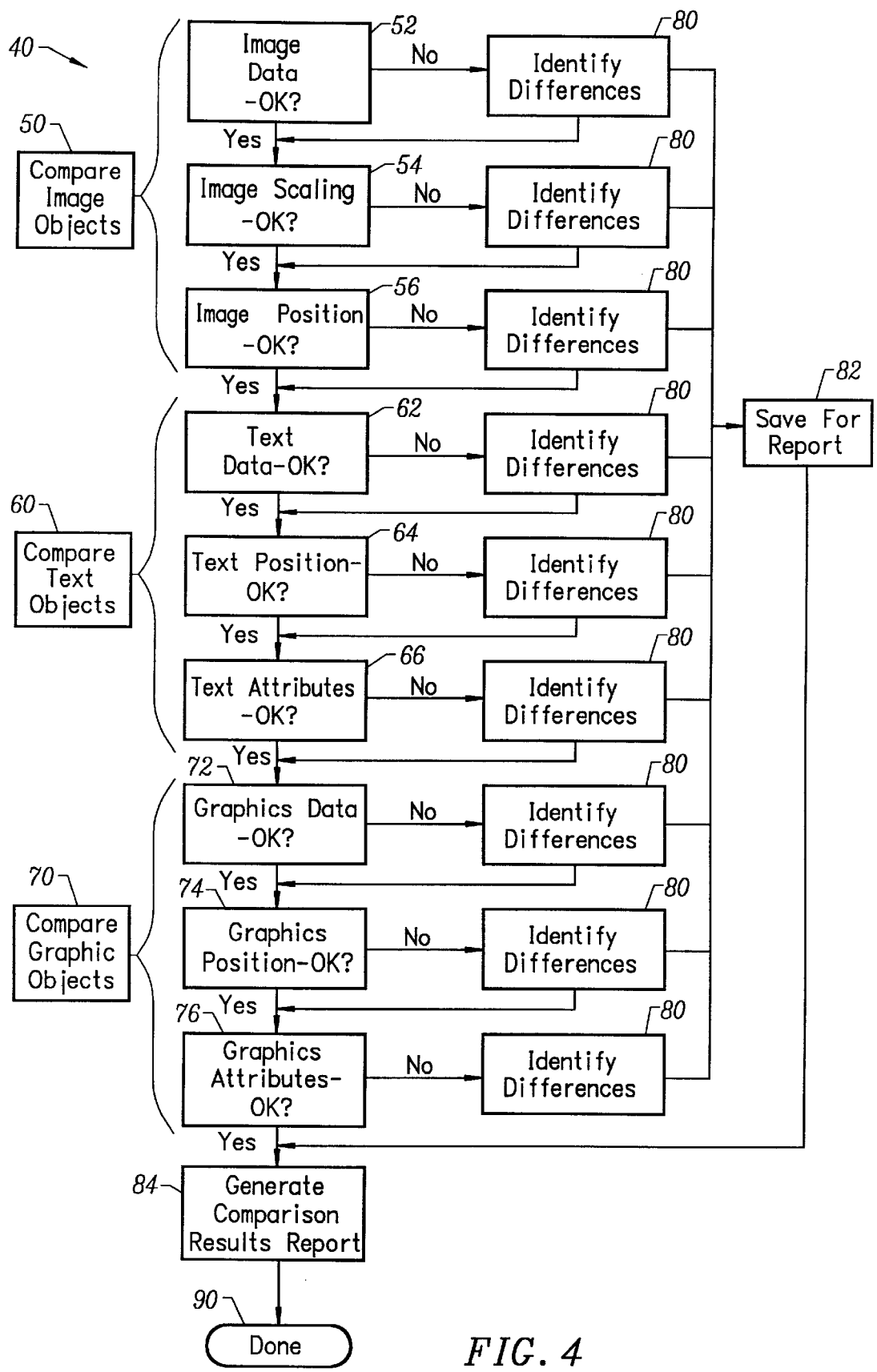
FIG. 4 is a more detailed flowchart of the operation of the system and method for regression testing using display lists, according to the invention.

Referring now to FIG. 4, a more detailed flowchart of the steps of the display list comparison system and method 10 of the invention is described. The DL regression testing module 9 (FIG. 1) causes the new objects 250, 260, 270 and reference objects 150, 160, 170 to be compared in groups of objects, providing a means to compartmentalize the results of the comparison. The compartmentalization narrows any subsequent investigation for source code errors to those sections of code which control image generation, thereby expediting the debugging process by focusing on the suspect portions of the code dealing with a changed object 250, 260, 270 in the new display list 200. Initially, the system compares 50 reference image objects 150 of the reference display list 100 with the new image objects 250 in the new display list 200. Although shown and described here as performing a comparison 40 of objects in the display lists 100, 200 in a specific order, the objects and attributes may be compared in any order. Additionally, certain objects may not be compared at all if a user knows that changes made to the original software program 12 included only certain object types.

Referring once again to FIG. 4, the DL regression testing module 9 first compares 52 new image data in the new display list 200 against reference image data in the reference display list 100. If the new image data and reference image data do not match, differences are identified 80, and the new image data and identified differences 101 are saved 82 for inclusion in the comparison results report 300. The DL regression testing module 9 then causes the next image object attribute, scaling, to be compared and verified or differentiated.

If the new and reference image data match, the DL regression testing module 9 immediately moves to compare 54 the next attribute, in this case the image scaling attributes. Once again, if the new image scaling attribute and the reference image scaling attribute are not equivalent, the new image scaling attributes are stored in the comparison results report 300 along with identified differences 101 between the new image scaling attributes and the reference image scaling attributes. In a similar manner, the DL regression testing module 9 will compare 56 the new image position against the reference image position to verify either equivalence or difference. Attributes specified for the image objects may be expanded to include additional attributes which describe the image object and are included in the generated display list, such as color, pattern, halftone, transparency and any other attribute included in a specific software program or PDL interpreter.

The DL regression testing module 9 then causes a similar, compartmentalized comparison process to be applied to text objects 160, 260. Attributes including text data, text position, text color, text data pointer and other descriptive attributes are compared 60 and either verified as equivalent to, or different from, text object attributes in the reference display list 100. Any differences 101 are identified 80 and saved 82 for eventual inclusion in the comparison results report 300. Similarly, for new graphic objects 270, attributes including graphics data, graphics position and other descriptive attributes are compared 70 and either verified as equivalent to, or different from, graphic object attributes in the reference display list 100. Again, any differences 101 are identified 80 and saved 82 for eventual inclusion in the comparison results report 300.

Once all reference display list objects 150, 160, 170 have been compared 40 against new display list objects 250, 260, 270 and either verified as equivalent or differentiated, and identified differences 101 saved 82 for inclusion in the comparison results report 300, a user may generate 84 the comparison results report 300 for viewing and to facilitate analysis. The user then evaluates the comparison results report 300 to identify opportunities for modifying the source code of the new software program version 14 so that further regression testing would eventually result in equivalence between the new display list objects 250, 260, 270 and the reference display list objects 150, 160, 170. The DL regression testing module 9 allows the user to set an equivalence threshold where any identified differences 101 which are less than the threshold are not saved and not included in the comparison results report 300. Hence, inexact, yet adequate, comparisons may be deemed sufficient for the quality control requirements specified by the user. The threshold can be different for each object type and/or attribute. For example, a greater difference may be allowed in the placement of images than in text.

The DL regression testing module 9 of the invention allows compartmentalized comparison testing to be performed on select portions of the new display lists 200. For example, if the original software program 12 has been modified to include a new font, when the new display list 200 is compared to the reference display list 100, the comparison may be restricted to just the text objects and attributes included in the display lists 100, 200 and the equivalence threshold for text may be reduced to zero to require exact matching for text only. This selective processing expedites the regression testing process and reduces the computational requirements associated with the regression testing. Similarly, if a new color palette has been introduced, regression testing may be limited to image objects 150, 250 included in the display lists 100, 200, and the equivalence threshold for text may be reduced to zero to require exact matching. By compartmentalizing the comparative regression testing to specific portions of the new display list 200, the likelihood of the introduction of erroneous anomalies in the analysis may be reduced.

This disclosure is provided to reveal a preferred embodiment of the invention and a best mode for practicing the invention. However, one skilled in the art will readily appreciate that other approaches may be substituted for those set forth herein without departing from the spirit and scope of the present invention. Further, additional advantages, applications and modifications of the invention will readily occur to those skilled in the art. Accordingly, the invention should only be limited by the claims included below.

What is claimed is:

1. A method for identifying and determining the source of changes in printed output when a software program that produces printed output is changed, comprising the steps of:
   providing a computer having a CPU, a memory device, a data storage device and an input device;
   connecting the computer to a video display terminal;
   connecting the computer to a printer;
   loading a display list regression testing software module into the memory of the computer;
   loading a first version of a software program into the memory of the computer system;
   issuing a set of known commands to the first version of the software program;
   causing the first version of the software program to generate at least one reference display list;
   loading a second modified version of the first software program into the memory of the computer system;
   issuing the set of known commands to the second version of the software program,
   causing the second version of the software program to create a new second display list,
   comparing the second display list to the reference display list,
   identifying any differences between the second display list and the reference display list,
   storing the differences in the computer memory for subsequent analysis to determine the probable cause of any difference between the reference display list and the second display list.

2. The method of claim 1, wherein the reference display list includes at least one object, the object having at least one attribute.

3. The method of claim 2, wherein the object is from a group consisting of graphical objects, image objects, and text objects,
   wherein the graphical objects have at least one attribute;
   wherein the image objects have at least one attribute; and,
   wherein the text objects have at least one attribute.

4. The method of claim 3 wherein said comparing step further includes the steps of:
   comparing the graphical objects in the new display list to corresponding graphical objects in the reference display list;
   comparing the text objects in the new display list to corresponding text objects in the reference display list; and,
   the image objects in the new display list to corresponding image objects in the reference display list.

5. The method of claim 3 wherein said second issuing step is preceded by the steps of:
   specifying object types likely to be affected by changes in the second version of the software program.

6. The method of claim 5 wherein said comparing steps is immediately preceded by the steps of:
   selecting portions of the second display list having object types likely to be affected by changes in the second version of the program;

instructing the display list regression testing module to ignore said portions of the second display list.

7. The method of claim 6, wherein said comparing step further includes the steps of:

comparing graphical objects in the at least one second display list to corresponding graphical objects in the at least one reference display list;

comparing text objects in the at least one second display list to corresponding text objects in the at least one reference display list;

comparing image objects in the at least one second display list to corresponding image objects in the at least one reference display list.

8. The method of claim 1 wherein said storing step is followed by the step of:

generating a comparison results report, wherein the comparison results report includes a listing of the differences between the second display list and the reference display list.

9. The method of claim 4 further including the steps of:

specifying an equivalence threshold, converting the differences into an equivalence measurement;

comparing the equivalence measurement to the equivalence threshold, wherein the equivalence measurement is greater than or equal to the equivalence threshold, causing the display list regression testing software module to remove the differences from the comparison results report.

10. The method of claim 1, further including the steps of:

modifying the second version of the first software program to create a third version to reduce or eliminate the differences between the reference display list and the second display list, loading the third version of the software program into the memory of the computer system, issuing the known commands to the third version of the software program, causing the third version of the software program to create a third display list, comparing the third display list to the reference display list, identifying differences between the third display list and the reference display list, storing the differences in the computer memory for subsequent analysis to determine the probable cause of any difference between the reference display list and the third display list;

determining whether the differences are significant; if significant, repeating said modifying step, said loading step, said issuing step, said causing step, said comparing step, said identifying step, said storing step and said determining step until the differences are not significant.

11. The method of claim 7, wherein said identifying step is followed by the steps of:

specifying an equivalence threshold, converting the differences into an equivalence measurement;

comparing the equivalence measurement to the equivalence threshold, wherein the equivalence measurement is greater than or equal to the equivalence threshold, causing the display list regression testing software module to remove the differences from the comparison results report.

12. A system for performing regression testing of software programs producing printed output, said system comprising:

a computer having a central processing unit and a memory device;

an input device in communication with said computer, said input device capable of allowing a user to issue commands to said computer;

a video display terminal connected to said computer;

a printer in communication with said computer;

a data storage device in communication with said computer;

a known software program loaded in said memory of said computer, wherein said known software program is capable of generating at least one known reference display list;

a modified second version of said known software program loaded in said memory of said computer, wherein said second version is capable of generating at least one second display list; and, a display list regression testing software module loaded in said memory of said computer, wherein said display list regression testing software module is capable of comparing said at least one reference display list to said at least one second display list to determine differences between said at least one reference display list and said at least one second display list and storing the differences between said at least one reference display list and said at least one second display list in said memory of said computer.

13. The system of claim 12, further including:

a comparison results report, wherein said comparison results report contains a listing of the differences between said at least one reference display list and said at least one second display list.

14. The system of claim 12, further including:

an equivalence threshold, said equivalence threshold specified by a user and communicated to said display list regression testing software module via said input device;

an equivalence measure, said equivalence measure calculated by said display list regression testing software module, wherein said equivalence measure provides a quantitative measure of the similarity of the at least one second display list to the at least one reference display list.

15. The system of claim 14, wherein said at least one reference display list and said at least one second display list are comprised of objects, said objects describing elements to be printed on a page derived from said at least one reference display list or said at least one second display list.

16. The system of claim 15, wherein said objects are from the group consisting of graphical objects, text objects and image objects.

17. The system of claim 16, wherein said objects are comprised of attributes, said attributes describing elements to be printed on a page derived from said objects included in said at least one reference display list or said at least one second display list.

18. The system of claim 12, further including:

a graphics equivalence threshold, said graphics equivalence threshold specified by a user and communicated to said display list regression testing software module via said input device;

a graphics equivalence measure, said graphics equivalence measure calculated by said display list regression testing software module, wherein said graphics equivalence measure provides a quantitative measure of the similarity of said graphical objects in said at least one second display list to said corresponding graphical objects in said at least one reference display list.

19. The system of claim 18, further including:

a text equivalence threshold, said text equivalence threshold specified by a user and communicated to said display list regression testing software module via said input device;

a text equivalence measure, said text equivalence measure calculated by said display list regression testing software module, wherein said text equivalence measure provides a quantitative measure of the similarity of said text objects in said at least one second display list to said corresponding text objects in said at least one reference display list.

20. The system of claim 19, further including:

a image equivalence threshold, said image equivalence threshold specified by a user and communicated to said display list regression testing software module via said input device;

a image equivalence measure, said image equivalence measure calculated by said display list regression testing software module, wherein said image equivalence measure provides a quantitative measure of the similarity of said image objects in said at least one second display list to said corresponding image objects in said at least one reference display list.

* * * * *